United States Patent [19]
Alton et al.

[11] 3,725,783
[45] Apr. 3, 1973

[54] COMBINED BRIDGE OUTPUT AND CHOPPER CIRCUIT

[75] Inventors: Ahdor H. Alton, Lake Zurich; Mitchell I. Kohn, Skokie, both of Ill.

[73] Assignee: Gulton Industries, Inc., Metuchen, N.J.

[22] Filed: Aug. 20, 1970

[21] Appl. No.: 65,626

Related U.S. Application Data

[62] Division of Ser. No. 827,714, May 26, 1969, Pat. No. 3,591,077.

[52] U.S. Cl. ................................. 324/101, 324/62
[51] Int. Cl. ...................... G01r 27/02, G01r 17/10
[58] Field of Search ....73/359, 361; 324/62, 65, 101, 324/105; 323/75

[56] References Cited

UNITED STATES PATENTS

| | | | |
|---|---|---|---|
| 2,769,340 | 11/1956 | Bernreuter et al. | 324/105 X |
| 2,871,701 | 2/1959 | Knudsen | 324/105 UX |
| 3,207,984 | 9/1965 | Tolliver | 324/105 |
| 3,577,074 | 5/1971 | Praglin | 324/98 |
| 3,158,026 | 11/1964 | McGhee | 73/361 |

Primary Examiner—Alfred E. Smith
Attorney—Wallenstein, Spangenberg, Hattis & Strampel

[57] ABSTRACT

A bridge output circuit is coupled between bridge output terminals of a D.C. bridge circuit including impedance means coupled between at least one of the bridge output terminals and a first output circuit terminal between which terminal and a common D.C. voltage input terminal of the bridge is coupled a capacitor, and a control signal input is arranged so the capacitor charges to a voltage which is a function both of the control voltage input and the voltage at the associated bridge output terminal. A chopping circuit comprising a pair of field effect transistors is coupled between the aforementioned output circuit terminal and another capacitor associated with the other bridge output terminal. A common capacitor at the juncture between the field effect transistors is alternately coupled by switching the field effect transistors alternately to the two aforementioned capacitors so that the common capacitor charges between the voltages of the other two capacitors.

10 Claims, 1 Drawing Figure

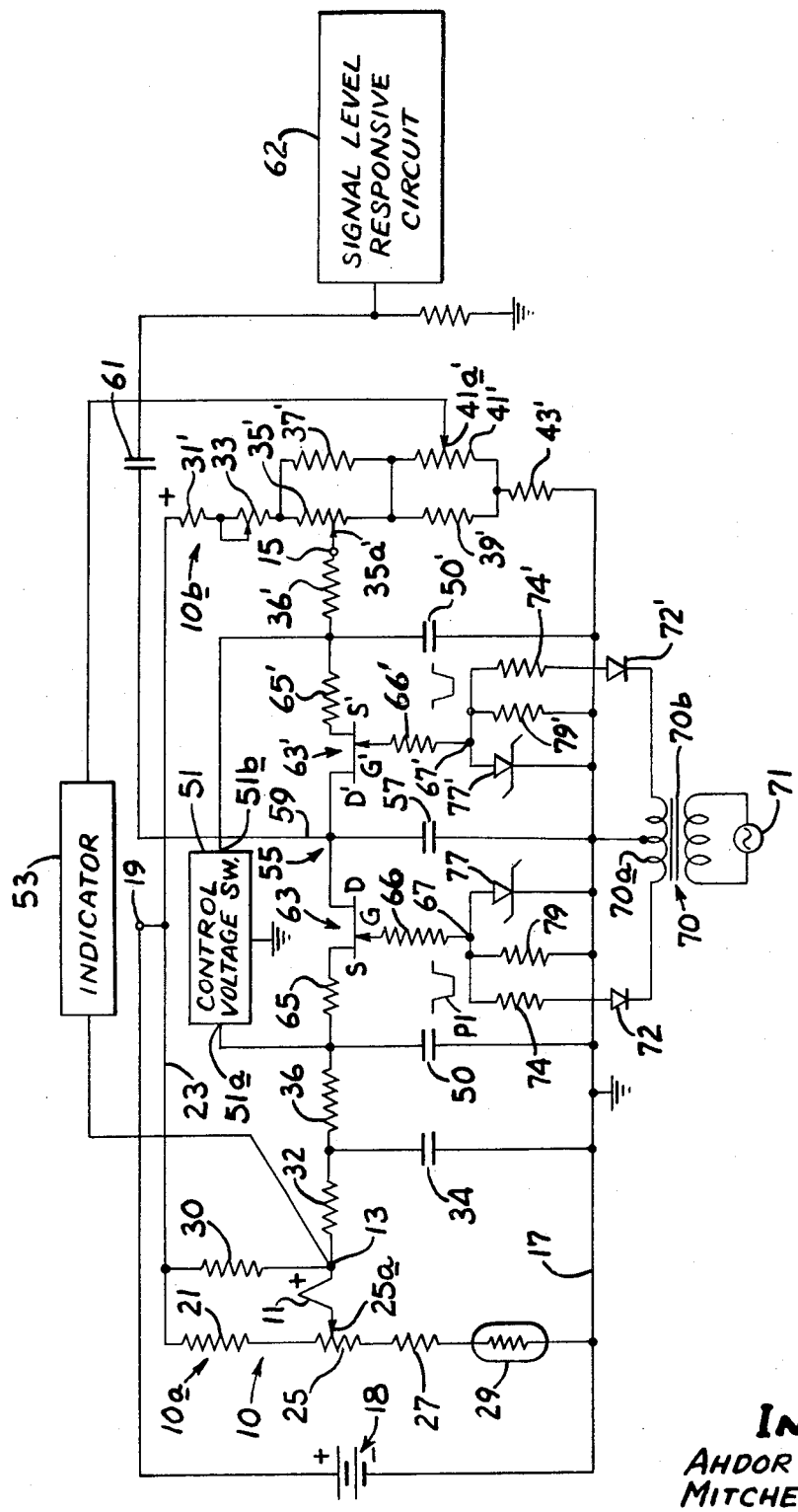

COMBINED BRIDGE OUTPUT AND CHOPPER CIRCUIT

This application is a division of application Ser. No. 827,714, filed May 26, 1969 entitled Proportioning Temperature Control Apparatus (now U.S. Pat. No. 3,591,077).

This invention relates to variable measuring circuits, more particularly to D.C. bridge type variable measuring circuits of the type wherein four arms of a bridge circuit are formed by two main branch circuits extending in parallel across a pair of the D.C. input terminals and the output of the bridge circuit is taken across intermediate points of the two branch circuits at a pair of output terminals dividing the two branches into two bridge arms per branch. A set point potentiometer or the like is associated with one of the branch circuits to adjust the value of the variable providing a given bridge output and a variable responsive means like a resistance or thermocouple is associated with the other branch of the bridge circuit.

The output of such a bridge circuit, which is a measure of the value of the variable being measured, may be applied to an indicator which indicates either the absolute value of the variable or the difference between the variable involved and some reference value. Frequently, as in the case of the temperature measuring circuit disclosed in said parent application Ser. No. 827,714, U.S. Pat. No. 3,591,077 the output of the bridge circuit is combined with one or more control voltages which perform control functions, such as controlling the operation of a heating or cooling device where a given temperature is to be maintained. Where the circuit is to respond to the variation in a bridge output voltage having a very small magnitudes in the microvolt range, difficulties exist in designing circuits accurately to respond to such small variations and to provide consistent results under widely varying ambient temperature conditions and the like.

The addition of control voltages to the variable responsive voltages produced by the bridge circuit output are generally combined in circuits separate from the bridge output circuit, which frequently introduce various error factors into the control system. Also, frequently, the output of the aforesaid bridge circuits are applied to separate chopper circuits so that the signals involved can be more readily amplified. The present invention deals, in part, in the discovery that a very flexible accurate, reliable and relatively uncomplex circuit results when the bridge output and control voltages are added together directly in a bridge output circuit coupled between the bridge output terminals and a common D.C. bridge input terminal and in a manner where the output circuit of the bridge circuit is not affected by the value of the control voltage added thereto.

Also, another feature of the invention is the provision of a unique chopping circuit which forms a part of the output circuit of the bridge. The chopping circuit most advantageously utilizes field effect transistors connected in a manner where a common ground can be used for the bridge circuit and the chopping circuit, and wherein wide variations in temperature do not produce any significant variation in the microvolt range varying chopped signal produced by the output circuit.

The above and other features of the invention will become more apparent upon making reference to the specification to follow, the claims and the drawings wherein the drawing illustrates the application of the invention to bridge circuit 10 for providing a chopped output signal which is an indication of the value of a variable, such as a temperature measured by a thermocouple 11. The bridge circuit includes a pair of bridge output terminals 13 and 15. A ground line 17 constitutes one of the energizing voltage inputs of the bridge circuit 10. The other energizing voltage input terminal is a terminal 19 connected to a source 18 of D.C. voltage. The bridge circuit includes a branch 10a including a resistor 21 connected between a positive bus 23 and one end of a potentiometer 25 whose opposite end is connected in series with a resistor 27 and a cold junction temperature compensating resistor 29 connected to the ground line 17. The thermocouple 11 is connected between a wiper 25a of the potentiometer 25 and the bridge output terminal 13. The thermocouple 11 may provide a progressively increasing voltage with increasing temperature, with the right hand end thereof being positive with respect to the left hand end so that the voltage at the bridge output terminal 13 will progressively become more positive with increase in temperature. A resistor 30 is shown connected between the output terminal 13 and the positive bus 23. The resistor 30 is an extremely large resistor relative to resistor 21 and is utilized to provide continuity for the bridge output circuit should the thermocouple 11 become open-circuited. For all practical purposes the resistor 30 can be ignored.

Variations in thermocouple lead length will have little effect on the circuit due to the position of the thermocouple in the circuit and the fact that the associated resistors are made so much larger than the thermocouple lead length resistance.

The voltage on the bridge output terminal 13 is coupled to a filter network comprising a resistor 32 connected between the terminal 13 and the output terminal of a capacitor 34 whose opposite terminal is connected to the ground line 17. The resistor 32 and the capacitor 34 act as a noise filter for noise signals picked up by thermocouple leads. The ungrounded terminal of the capacitor 34 is shown coupled through a resistor 36 (which, for example, may be a 4,700 ohm resistance) to the upper terminal of a filter capacitor 50 (which may have a value, for example, of 20 mfd.) whose opposite terminal is connected to the ground line 17. A control voltage source is illustrated which has output terminals 51a and 51b at which respective control voltages with respect to ground appear. The terminal 51a is connected to the ungrounded terminal of capacitor 50 as the variable value indication voltage (or charge resulting therefrom) and the control voltage on terminal 51a are mixed or effectively added in the capacitor 50.

The bridge circuit 10 has another branch 10b extending between the D.C. voltage input terminals 19 and the ground line 17. This branch 10b as illustrated includes a resistor 31' connected between the positive bus 23 and a variable resistor 33' which, in turn, is connected to a parallel circuit comprising a potentiometer 35' and a resistor 37'. The wiper 35a' of potentiometer 35' is connected to the bridge output terminal 15. The latter parallel connected resistors are connected in series with a resistor 39' connected in parallel with a potentiometer 41'. The latter resistors are connected through resistor 43' to the ground line 17.

A suitable temperature indicator 53 is shown connected between the aforementioned bridge output terminal 13 and the wiper 41a' of potentiometer 41' which may be said to be coupled to the bridge output terminal 15. As will appear, the points in the bridge circuit to which indicator 53 are connected are not effected by the control voltages fed to the output circuit of the bridge.

The said bridge output terminal 15 is connected through a resistor 36' corresponding in value to the aforementioned resistor 36 to the upper terminal of a capacitor 50', corresponding in value and function to the capacitor 50, whose opposite terminal is connected to ground line 17. The other terminal 51b of the control voltage source 51 is connected to the ungrounded or upper terminal of capacitor 50' so the voltage on bridge output terminal 15 (or charge resulting therefrom) is added or mixed with the voltage on terminal 51b of the control voltage source 51 in the capacitor 50'.

A chopper circuit generally indicated by reference numeral 55 alternately and cyclically connects a capacitor 57 across the capacitors 50 and 50'. The time constant of the charge circuits for the capacitor 57 is sufficiently short that it will completely charge up to the voltage on the capacitors 50 and 50' during the time it is connected separately to these capacitors. The voltage on the capacitor 57 will, therefore, change only as the relative voltages stored in the capacitors 50 and 50' change. A conductor 59 connects the ungrounded terminal of the capacitor 57 to a D.C. blocking capacitor 61 which in turn feeds the input to a signal level responsive circuit 62 whose input signal therefore is a function solely of the differences in the voltages across the capacitors 50 and 50'. This voltage difference can advantageously fluctuate in the microvolt range, such as over a range of 100 microvolts more or less. The ungrounded end of the capacitor 57 is connected to the drain electrodes D and D' of a pair of N channel field effect transistors 63 and 63'. The supply electrode S and S' of the field effect transistors 53 and 53' are respectively coupled to the ungrounded terminals of capacitors 50 and 50' through resistors 65 and 65', respectively. In the exemplary circuit being described, the resistors 66 and 66' may be, for example, 3,300 ohms. The gate electrodes G and G' of the field effect transistors 63 and 63' are respectively connected through resistors 66 and 66' to signal input terminals 67 and 67' which receive clipped half wave rectified negative pulses P1 derived from the secondary winding 70a of the transformer 70 whose primary winding 70b is connected to a suitable source 71, for example, of 60 cycle A.C. voltage. The opposite ends of the secondary winding 70a are connected respectively through rectifiers 72 and 72' and resistors 74 and 74' to the signal input terminal 67 and 67' respectively. Zener diodes 77 and 77' connected between the terminals 67 and 67' and the ground line 17 act as clippers which clip the half wave rectified voltage at steep points in the voltage waveforms involved so that negative pulses appearing as square waves are fed to the terminal 67 and 67'. Resistors 79 and 79' are connected in parallel with the Zener diodes 77 and 77'. The negative voltages appearing on the terminals 67 and 67' during alternate half cycles of the 60 cycle waveform of the A.C. voltage source 72 alternately drive the field effect transistors to a high resistance condition so that during the intervening half cycles the field effect transistors conduct to couple the capacitor 57 alternately through the resistors 65 and 65' to the capacitors 50 and 50'.

The conducting impedances of the field effect transistors are so much smaller than the value of resistors 65 and 65' that an insignificant portion of the voltage across the capacitors 50 and 50' are dropped across the load terminals of the field effect transistors. Similarly, the time constant of the circuit for charging the capacitor 57 is such that the capacitor 57 charges substantially to the full applied voltage of the circuit involved (namely the voltage across the capacitors 50 and 50') during the time that the field effect transistors are in their conducting conditions.

The combination bridge and chopper circuit described requiring only a single power supply operating with a grounded input reduces the cost, eliminates or minimizes noise and common mode problems and increases the reliability of the circuit.

It should be understood that numerous modifications may be made in the most preferred forms of the invention described above without deviating from the broader aspects described above.

We claim:

1. A variable responsive D.C. bridge circuit comprising: a pair of D.C. voltage input terminals, a pair of resistance-containing branches extending between said voltage input terminals, there being associated with one of said branches variable responsive means for producing a variation in a voltage between a point coupled to an intermediate point of said one branch and constituting a first bridge output terminal and a point in common between said branches, a second bridge output terminal coupled to an intermediate point of the other branch circuit, a first output circuit terminal, and an output circuit coupled between said first and second bridge output terminals and including impedance means coupled between at least one of said bridge output terminals and said output circuit terminal, and a control voltage source whose output is to be superimposed on the output of the bridge circuit, a first capacitor connected between said output circuit terminal and said common point, said variable responsive voltage being coupled to said capacitor through said impedance means, and means coupling said control voltage source to said first capacitor so the capacitor charges to a voltage which is a function of both said variable responsive voltage and control voltage.

2. The variable responsive D.C. bridge control circuit of claim 1 wherein there is provided means for indicating the value of the variable comprising indicator means coupled between said bridge output terminals, and said impedance means isolating said one bridge output terminal from said output circuit terminal so the control voltage fed to said output circuit terminal has no effect on the indication of said indicator means.

3. The variable responsive D.C. bridge control circuit of claim 2 wherein said impedance means has a value such that variations in the control voltage at said output circuit terminal are not reflected back to said first bridge output terminal to which said indicator means is coupled.

4. The variable responsive D.C. bridge control circuit of claim 1 wherein said other branch circuit includes means for setting the initial voltage at said second bridge output terminal.

5. The variable responsive D.C. bridge control circuit of claim 4 wherein said control voltage source provides two component control voltages with respect to said common point at two output terminals thereof, a second output circuit terminal, second impedance means connected between said second bridge output terminal and said second output circuit terminal, a second capacitor coupled between said second output circuit terminal and said common point, means respectively connecting said output terminals of said control voltage source respectively to the terminals of said first and second capacitors remote from said common point, each of said first and second capacitors charging to a voltage which is a function both of the respective control voltage fed thereto and the voltage between the nearest bridge output terminal and said common point, said first impedance means between said first bridge output terminal and said first output circuit terminal and said second impedance means between said second bridge output terminal and said second output circuit terminal respectively isolating said bridge circuit output terminals from the voltage at said output circuit terminals, and switching means for alternately applying the voltages between said output circuit terminals and said common point to an external control circuit.

6. The variable responsive D.C. bridge control circuit of claim 5 wherein said switching means comprise a third capacitor a pair of switching devices with the corresponding load terminals thereof respectively coupled between said output circuit terminals and one terminal of a third capacitor whose other terminal is coupled to said common point the connections of the circuit to said external control circuit being from points across said third capacitor remote from said common point.

7. The variable responsive D.C. bridge control circuit of claim 6 wherein said switching means are field effect transistors whose conducting resistances are insignificant relative to said first and second impedance means.

8. A combined variable responsive D.C. bridge control and chopper circuit comprising: a pair of D.C. voltage input terminals, a pair of resistance-containing branches extending between said voltage input terminals, there being associated with one of said branches variable responsive means for producing a variation in the voltage with the variable value between an output point coupled to an intermediate point of said one branch which output point constitutes a first output terminal of the bridge circuit and a point in common between said branches, said bridge having a second output terminal connected to an intermediate point of said other branch; first and second capacitors respectively coupled between said bridge output terminals and said common point; means for coupling a control voltage to at least one of said capacitors so the voltage of said capacitor is a function of the control voltage and the voltage between the adjacent output terminal and said common point, the other capacitor charging to a voltage which is a function of the voltage between the other output terminal and said common point, a third capacitor having one plate connected to said common point, switch means for connecting the other plate of said third capacitor alternately and cyclically to the plate of said first and second capacitors remote from said common point, and means for coupling the voltages of said third capacitor to an external control circuit.

9. In combination, a chopper circuit comprising first and second input terminals across which respectively are to be coupled separate variable D.C. voltages with respect to a common reference point, a pair of switch means having load terminals connected in series between said input terminals, a capacitor coupled between the juncture of said load terminals of said switch means and said common reference point, means for alternately rendering said switch means alternately conductive to couple said capacitor alternately to said first and second input terminals at a desired chopping rate, the time constant of the circuit including said capacitor between each of said input terminals and said common reference point being sufficiently short so the capacitor charges to the voltage applied between each input terminal and said common reference point during the conducting period of the switch means involved, and means for coupling the voltage variation of said capacitor to a circuit external to the chopper circuit; and a bridge circuit having first and second output terminals respectively coupled to said first and second input terminals of said chopper circuit, said bridge circuit having a pair of D.C. energizing input terminals and a pair of resistance containing branches extending between said energizing voltage input terminals, there being associated with at least one of said branches variable responsive means for producing a variation in the voltage between a point associated with said one branch and constituting one of said bridge output terminals of the bridge circuit and a point in common with said branches, the other branch having a point associated therewith constituting the other bridge output terminal.

10. The combination of claim 9 wherein said switch means are a pair of field effect transistors with the corresponding load terminals thereof respectively connected between said capacitor and the associated bridge output terminals, said means for rendering said switch means alternately conductive including means for feeding signals to the gate terminals of said field effect transistors for alternately rendering the same conductive and non-conductive.

* * * * *